United States Patent [19] [11] 4,151,097
Nelson [45] Apr. 24, 1979

[54] LIQUID SYSTEMS

[75] Inventor: Robert T. Nelson, Wirral, England

[73] Assignee: Lever Brothers Company, New York, N.Y.

[21] Appl. No.: 916,336

[22] Filed: Jun. 15, 1978

Related U.S. Application Data

[63] Continuation of Ser. No. 816,681, Jul. 18, 1977, abandoned.

[30] Foreign Application Priority Data

Jul. 26, 1976 [GB] United Kingdom ............... 31070/76

[51] Int. Cl.$^2$ ........................................... D06M 13/10
[52] U.S. Cl. ......................................... 252/8.6; 8/84; 8/115.6; 252/8.8; 252/8.9
[58] Field of Search ........................ 252/8.6, 8.8, 8.9; 8/84, 115.6

[56] References Cited

U.S. PATENT DOCUMENTS

| | | | |
|---|---|---|---|
| 2,093,863 | 9/1937 | Clarkson et al. | 252/8.6 |
| 3,048,539 | 8/1962 | Kocay et al. | 252/8.9 |
| 3,620,665 | 11/1971 | Lanner | 8/115.6 |
| 3,637,495 | 1/1972 | Eckert et al. | 252/8.8 |
| 3,971,733 | 7/1976 | Hawkins | 252/8.6 |
| 3,974,076 | 8/1976 | Wiersema et al. | 252/8.8 |
| 3,983,272 | 9/1976 | Huber et al. | 428/391 |

Primary Examiner—William E. Schulz
Attorney, Agent, or Firm—Michael J. Kelly; James J. Farrell; Melvin H. Kurtz

[57] ABSTRACT

Liquid formulations for use in treating fabrics deposit a material providing a perceivable effect. The effect producing material is a component, in admixture with an organic matrix material and a cationic material, of a dispersed phase in an aqueous medium. The cationic material causes deposition of the dispersed phase onto a fabric allowing the effect producing material to act on the fabric surface. Optionally a fabric conditioning material is present in the aqueous phase.

21 Claims, No Drawings

LIQUID SYSTEMS

This is a continuation of application Ser. No. 816,681, filed July 18, 1977.

This invention relates to liquid formulations capable of depositing a material giving a sensorialy perceivable effect onto fabric surfaces. The formulation may be used in diluted form and examples of the fabric surfaces are cotton, polyacrylic, polyamide and polyester fibres, wool and flax.

The sensorialy perceivable material to be deposited would be selected to provide a desired effect on the surface and examples of this material are fluorescers, whitening agents, perfumes, pigments, dyes, bactericides, textile conditioning agents, for example fabric softening agent, anti-oxidants and antistatic agents. The invention proposes liquid formulations for fabric treatment comprising (i) from about 0.5% by weight to about 50% by weight of a first dispersed phase consisting of particles, being a mixture of (a) from about 25% to about 99% of substantially water insoluble organic matrix material;

(b) from about 0.5% to about 25% of cationic material and (c) from about 0.5% to about 50% of sensorialy perceivable material dispersed in (ii) from about 50% to about 99.5% of an aqueous phase.

Optionally the formulation contains from about 0.5% to about 30% of a second dispersed phase comprising a fabric conditioning material.

Preferably the fabric conditioning material is a fabric softener.

The term sensorialy perceivable material is used to define a material which, when deposited on a fabric surface is detectable directly or indirectly by a human sense. Thus a perfume, a preferred material for deposition, is an odiferous composition detected by the olfactory sense, a fabric softener material is perceivable by the sense of touch (tactile) and fluorescers are perceivable by the visual sense. Materials capable of changing the surface of fabric so as to alter the sound made during movement are also included. Some sensorialy perceivable materials act directly on a human sense, for example a perfume, while some materials will be perceived indirectly by their action on another substance. An example is a bactericide which can be detected by a reduction in the odour of fabrics due to bactericidal action on micro-organisms.

These micro-organisms will collect on the fabrics during use. Another sensorialy perceivable material providing a reduction in odour is an anti oxidant.

An effect on the surface will, with some formulations, be achieved by the deposition of the organic matrix material. That is to say the organic matrix may provide a desirable effect additional to that obtained from the sensorially perceivable material.

For example, with textiles, deposition of long chain fatty alcohols, which are usable as the organic matrix material, provide a detectable effect in respect of textile handling.

It is necessary to ensure a minimum proportion of soluble cationic material in ionic form is in the aqueous phase, because such free cationic material in the liquid phase will preferentially adsorb, or at least adsorb in competition with the particles of the first dispersed phase. This preference or competition could lead to an inefficient deposition of the dispersed phase on the surface.

One cause of inefficient deposition is charge reversal of the naturally negatively charged surface, which can occur if sufficient positively charged ions are absorbed thereon to be numerically greater than the inherent negative charge of the surface. This reversal occurs with synthetic polymer surfaces, for example textiles of polyacrylics, polyesters and polyamides. These are hydrophobic. On these materials the negative charges are not as abundant as they are on hydrophilic materials, for example cotton. Where the positively charged ions are derived from cationic materials disclosed herein, the alkyl chain on these molecules can absorb onto synthetic polymer surfaces and be bound by hydrophobic interaction. Thus, the binding of these cationic materials does not depend solely upon a charge interaction between the positive centre of the cationic and a negative site on the substrate. This charge reversal effect was demonstrated by measuring zeta potentials by a streaming potential technique on acrylic and cotton textile samples. These samples were immersed in solutions of sodium chloride ($5 \times 10^{-4}$ molar) at a pH of 6. On addition of cetyl trimethyl ammonium bromide (CTAB) at a strength of $10^{-4}$ molar the zeta potential for the acrylic sample reversed in sign whereas that of the cotton sample did not.

The particle size of the first disposed phase will usually be in the range from about 0.1 to about 20 micron, more usually about 1.0 to about 20 micron.

The cationic material in the first dispersed phase is preferably present in an amount of from about 2% to about 10% of that phase. The first dispersed phase may be present in an amount up to about 10%; this range will preferably be used when the matrix material also provides a sensorialy appreciable effect. When the formulation contains a second dispersed phase, the first dispersed phase will be preferably present in an amount up to about 2%.

The components and parameters for the deposition formulation will now be considered in turn.

Organic Matrix Materials

It is necessary for the matrix material to have a solubility at 25° C. in the liquid phase of not more than 200 parts per million, preferably not more than 50 parts per million. Examples of the matrix materials are primary or secondary fatty alcohols of the formula R OH, e.g. stearyl alcohol, oleyl alcohol, cetyl alcohol and tallow alcohol, hydrocarbons of the formula R CH$_3$, e.g. octadecane, eicosane, docosane and tetracosene, aldehydes and ketones of the formula R CO R$^2$, e.g. methyl stearyl ketone and stearyladehyde, fatty acids of the formula R COOH, e.g. tallow fatty acid, coconut fatty acid, oleic acid, stearic acid and behenic acid, and esters of such acids with the formula R CO OR$^1$ or R CO OR$^2$, e.g. ethyl palmitate and stearyl stearate. In these formulae R and R$^1$ are saturated or unsaturated alkyl or alkylaryl groups and may be straight or branched chain. The number of carbon atoms will be from 8 to 22, preferably 14 to 22. R$^2$ is hydrogen or an alkyl group with 1 to 4 carbon atoms.

Other examples of classes of matrix materials which can be used are fatty acid amides with the formula R CON R$^3$R$^4$ wherein R$^3$ and R$^4$ are each hydrogen, alkyl groups with 1 to 4 carbon atoms, —CH$_2$CH$_2$OH, —(CH$_2$)$_3$OH or —CH(CH$_3$)CH$_2$OH, e.g. tallow diethanolamide and coconut monoethanolamide. Amines with the formula RN R³R⁴ of R R¹NR³, e.g. stearyl diethanolamine and ditallowmethylamine, ethers with the formula RO R¹ or RO R², e.g. stearyl ethyl ether and epoxides with the formula

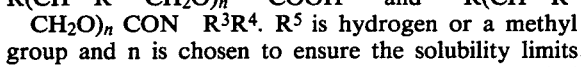

e.g. stearyl epoxide. The alkylene oxide adducts of fatty alcohols, fatty acids and fatty amides are also usable as the matrix materials. These adducts have the respective formulae R(CH R⁵ CH₂O)$_n$OH, R(CH R⁵ CH₂O)$_n$ COOH and R(CH R⁵ CH₂O)$_n$ CON R³R⁴. R⁵ is hydrogen or a methyl group and n is chosen to ensure the solubility limits quoted above are not exceeded, e.g. tallow alcohol condensed with an average of 3 moles of ethylene oxide, tallow amide condensed with an average of 5 moles of ethylene oxide and oleic acid condensed with an average of 3 moles of ethylene oxide. Di-basic carboxylic acids are also examples of usable matrix materials.

It will be noted the above list of examples includes carboxylic acids. These materials have a low solubility in the liquid phase and further have a low dissociation constant. In the dispersed phase of the formulation the are able to act as a matrix material.

The organic matrix material will be non-cationic and will preferably be nonionic. The term nonionic defines a material not producing ionic species in contact with the aqueous phase, or producing such species only to a negligible extent.

Cationic Materials

Suitable materials are found in both the soluble and insoluble classes of cationic materials. Any cationic material used must not have a solubility in water greater than 5g per liter at 25° C. Thus both cationic surfactants and cationic materials useful as fabric softening agents can be used; the latter are preferred. The class of amphoteric compounds, whose ionic species is dependant on the pH of the liquid phase, can also be used to provide the cationic material with selection of the pH in the system. For amphoteric compounds, as the pH moves to the acid at a specific pH the species becomes cationic and will become effective in the formulation of the present invention.

It must be appreciated that the boundaries between soluble and insoluble materials cannot be clearly drawn, thus a class of materials generally thought of as soluble can be regarded as insoluble when the length of the alkyl chain or chains are over a specific limit. The less soluble cationic materials are preferred because they will not be so readily leached from the dispersed particles during storage; these materials will preferably have a solubility not greater than about 50 ppm.

Generic examples of soluble cationics are listed below:

Alkyl quaternary ammonium salts: R N⁺(R¹R²R³) X⁻, e.g. cetyl trimethyl ammonium bromide and tallow trimethyl ammonium bromide.

Alkyl pyridinium salts:

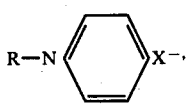

e.g. lauryl pyridinium chloride and cetyl pyridinium chloride.

Alkylaryl quaternary ammonium salts: R N⁺(R¹R²)₂C₆H₅X⁻, e.g. stearyl dimethyl benzyl ammonium chloride.

Amine salts: R—N⁺ R¹R²H X⁻, e.g. C₁₂H₂₅ N⁺(CH₃)₂H.CH₃CO⁻₄, in which R is an alkyl chain of 8 to 22 carbon atoms, preferably 12 to 18 carbon atoms,
R¹, R², R³, R⁴ are methyl, ethyl or propyl radicals,
X is an anion for example halogen (e.g. chloride or bromide), sulphate, acetate, methosulphate and ethosulphate.

Examples of the insoluble cationics usable as fabric softeners are:

Dialkyl quaternary ammonium salts: R¹R²N⁺R³R⁴ X⁻, e.g. distearyl dimethyl ammonium chloride, dicoco-dimethyl ammonium chloride and di(2-stearoyloxyethyl) dimethyl ammonium chloride.

Amine salt derivatives: R¹R²N⁺R³ H X⁻, e.g. C₁₇H₃₅CONHCH₂—N⁺H(CH₃)(C₁₇H₃₅)CH₃COO⁻ and (C₁₇H₃₅CONHCH₂CH₂)₂N⁺H₂HCOO⁻. Compounds with one long alkyl chain: R¹N⁺ R³R⁴R⁵ X⁻, e.g. C₁₇H₃₅COOCH₂CH₂N⁺H(CH₃)₂CH₃COO⁻, wherein R¹, R² are alkyl chains of 12 to 25 carbon atoms optionally containing amide or ester linkages, R³, R⁴ are methyl, ethyl or propyl radicals, R⁵ is H, methyl, ethyl, or propyl, X⁻ is an anion, for example Cl⁻, BR⁻, I⁻, CH₃SO₄ , C₂H₅SO₄⁻, CH₃COO⁻, SO₄⁼.

Examples of the amphoteric compounds which are usable are given hereunder:

Alkyl sulphobetaines:
(i) R—N⁺(R¹)₂R²SO₃⁻, e.g. hexadecyl dimethyl ammonio propane sulphonate.
(ii) R——CH(N⁺R₃¹)—R²SO₃⁻

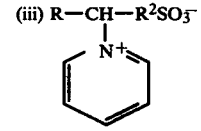

e.g.

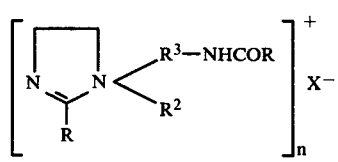

Amine Oxides: RN→O, e.g. hardened tallow dimethyl amine oxide.
Carboxybetaines: R—N(R¹)₂R²COO⁻, e.g. C₁₈H₃₇N⁺(CH₃)₂CH₂—CH²COO⁻. Hydroxamic betaines, R N⁺(R¹)₂CH₂CONHOHCl⁻, e.g. C₁₈H₃₇N⁺(CH₃)₂ CH₂ CONHOHCl⁻
wherein R is an alkyl chain of 8-22, preferably 12 to 18 carbon atoms,
R¹ is methyl or ethyl
R² is a short alkyl chain of 1 to 4 carbon atoms.

Another class of cationic fabric softening agents usable in the first dispersed phase is based on imidazoline and has the general formula

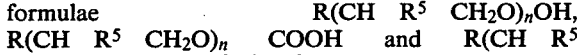

wherein R and R¹ are each substantially linear aliphatic hydrocarbon groups having from 15 to 24 carbon atoms, R² is an alkyl group having from 1 to 4 carbon atoms $R^3$ is a divalent alkylene group having from 1 to 4 carbon atoms, and X is an anion and n is an integer equal to the charge on X.

Liquid phase

The liquid phase will be aqueous but will normally contain other materials, for example, short chain alcohols, buffering agents to provide the necessary pH, for example to ensure any amphoteric surfactant or conditioning agent is in the cationic form, and electrolytes may also be present. Emulsifiers, colouring materials, perfumes, bactericides and surface active agents are also optional components of the aqueous liquid phase.

An optional component in the liquid phase is a dispersed fabric conditioning agent in an amount of from about 0.5% to about 30%; preferably this may be present in an amount of from about 2% to about 15%. This agent may be a fabric softening agent; examples of these materials have been previously quoted in the paragraph describing the cationic materials present in the first dispersed phase.

Methods of preparation

While it has been found that several methods of preparation give the desired deposition properties certain of these methods are preferred. The preferred method has the melting together of the organic matrix material, cationic material and sensorialy perceivable material as a first step. The melt may then be dispersed in hot water with subsequent cooling or the melt may be solidified and dispersed into cold water. Optional further components of the aqueous phase, and the second dispersed phase, may then be added. Examples of apparatus usable to cause dispersion of the organic matrix material in the liquid phase are high speed stirrers, ultrasonic dispersers, vibrating reeds and continuous mixers. These devices provide different particle sizes which will be of specific utility for different formulations.

Examples of formulations of the invention will now be given.

EXAMPLE I 98g tallow alcohol ethoxylated with an average of 3 moles of ethylene oxide (TA3EO), as the organic matrix material, and 2g Sudan Black B (Solvent Black 3—Colour Index 26150) were melted together. Cetyl trimethyl ammonium bromide (CTAB) was melted into this mixture at the following levels:

0, 0.5, 1.0, 2.0, 5.0, and 10.0g for each 100g of mixture of tallow alcohol 3EO and Sudan Black B.

These mixtures were emulsified with water at 30° C. while still in the molten state, using a Minisonic 4 homogeniser (Ultrasonics Ltd, Shipley, Yorks) to form 1% concentrations.

Fabric pieces, of cotton terry towel and of bulked acrylic knitted fabric, was rinsed in dilutions of these emulsions (30g of emulsion per liter of water) at a liquor to cloth ratio of 75:1, 25° C., in a Terg-O-Tometer (US Testing Co Inc) for 5 minutes at 50 cycles per minute agitation. The fabrics were removed, and excess liquor was removed by a spin dryer, before the pieces were completely dried in a heated drying cabinet.

Reflectances of the fabrics were measured spectrophotometrically before and after treatment. Reflectances were measured using a Zeiss Elrepho Reflectance Spectrophotometer at a light wavelength of 620 nm, and converted to K/S values (K=absortivity coefficient and S=scattering coefficient) by the appropriate Kubelka-Munk relationship. The K/S quantity is proportional to the weight of colouring matter present.

$\Delta K/S$, the difference between K/S for the dyed fabric and the original fabric was computed and represents the amount of dye taken down onto the fabric during the rinse.

| % Amount of CTAB Incorporated | $\Delta \frac{K}{S}$ Cotton Terry Towel | $\Delta \frac{K}{S}$ Acrylic Textile |
|---|---|---|
| 0 | 0.038 | 0.216 |
| 0.5 | 0.015 | 0.584 |
| 1 | 0.053 | 0.416 |
| 2 | 0.514 | 0.254 |
| 5 | 0.849 | 0.113 |
| 10 | 0.911 | 0.062 |

In this system, the optimum amount of CTAB for the cotton fabric is above 1%, and for the acrylic it is between 0.5 and 2% by weight of the nonionic. These optimum regions overlap between 1% and 2% CTAB, where enhanced deposition is achieved on both fabrics.

EXAMPLE II

Tallow alcohol 3EO and Sudan Black B were melted together in the same quantities as in Example I, and were emulsified into water in the manner described therein, without CTAB. CTAB solutions were prepared and added separately to the dispersion at such levels that the proportions of CTAB to the tallow alcohol 3EO/Sudan Black B mixture were the same as in Example I.

The mixtures were used to treat fabrics as in Example I with the following results:

| % Amount of CTAB added to the Dispersion (Proportional to the Weight of Dispersed Material) | $\Delta \frac{K}{S}$ Cotton Terry Towel | $\Delta \frac{K}{S}$ Acrylic Textile |
|---|---|---|
| 0 | 0.010 | 0.120 |
| 0.5 | — | 0.457 |
| 1 | 0.015 | — |
| 2 | — | 0.173 |
| 5 | 0.456 | 0.119 |
| 10 | 0.777 | — |

The optimum level of CTAB for cotton was about 1% and for acrylic it was between 0.5% and 2% by weight of the matrix material.

EXAMPLE III

The mixtures of Example I were prepared, but they were allowed to cool and solidify prior to dispersion into cold water. The other experimental parameters were those of Example I. The results were:

| % Amount of CTAB Incorporated | $\frac{K}{S}$ Cotton Terry Towel | $\frac{K}{S}$ Acrylic Textile |
|---|---|---|
| 0 | 0.106 | 0.389 |
| 0.5 | 0.722 | 0.964 |
| 1 | 0.484 | 1.224 |
| 2 | 0.930 | 0.522 |
| 5 | 0.699 | 0.482 |
| 10 | 0.710 | 0.211 |

The optimum amount of CTAB in this case, for cotton, was between 0.5% and 5%, and for acrylic it was also between 0.5% and 5% by weight of the matrix material. It will be noted these results are better than those quoted in Example I where the dispersed phase was dispersed while molten.

The effect achieved in Examples I, II and III will be seen to decrease in the order III, I and II. This reduction follows from the amount of free cationic in the liquid phase. The method of preparation used in Example III produces the least amount of cationic in the liquid phase.

EXAMPLE IV 98g tallow alcohol 3 EO and 2g Sudan Black B were melted together with 0, 0.5, 1.0, 2.0, 5.0, 10.0g of distearyl dimethyl ammonium chloride. Dispersions were prepared using the method of Example I.

The results were:

| % Amount of Distearyl Dimethyl Ammonium Chloride Incorporated | $\Delta \frac{K}{S}$ Cotton Terry Towel | $\Delta \frac{K}{S}$ Acrylic Textile |
|---|---|---|
| 0 | 0.194 | 0.157 |
| 0.5 | 0.012 | 0.647 |
| 1 | 0.012 | 0.751 |
| 2 | 0.010 | 0.418 |
| 5 | 1.177 | 0.186 |
| 10 | 1.214 | 0.115 |

The optimum amount of cationic for cotton is above 2%, and for the acrylic it is between 0.5 and 5% by weight of the nonionic. The best level for both fabrics is between 2% and 5% cationic.

EXAMPLE V

Example I was repeated using dodecyl trimethyl ammonium bromide (DTAB) instead of CTAB. The results were as follows:

| % Amount of DTAB Incorporated | $\Delta \frac{K}{S}$ Cotton Terry Towel | $\Delta \frac{K}{S}$ Acrylic Textile |
|---|---|---|
| 0 | 0.214 | 0.125 |
| 0.5 | 0.010 | 0.142 |
| 1 | 0.007 | 0.404 |
| 2 | 0.060 | 0.982 |
| 5 | 0.229 | 0.803 |
| 10 | 0.329 | 0.464 |

The optimum amount of cationic for cotton was above 2% and for acrylic it was between 0.5 and 10%. Enhanced deposition was achieved on both fabrics between 2% and 10% cationic by weight of the nonionic.

EXAMPLE VI 9g tallow alcohol 3EO and 1g ditertiary butyl-hydroxy toluene (an antioxidant) were melted with 2g of distearyl dimethyl ammonium chloride, mixed thoroughly and allowed to solidify. The waxy solid was made into a paste and then a cream by grinding with an increasing amount of water in a pestle and mortar. The cream was finally dispersed in water, to a total volume of 500 ml by stirring for 1 minute with a high speed stirrer to form product A. Control product B was prepared by dissolving 4g of the antioxidant in acetone (10 ml) and making up to 2 liters with water.

Two naturally soiled pillowcases were washed for 5 mins at 40° C. in a paddle type washing machine. An unperfumed, but otherwise conventional, detergent product was employed at 0.2%. After rinsing, the pillowcases were cut in half and one half of each was further rinsed (5 mins at 20° C.) in 2 liters of water containing 10 ml of the above dispersion. The other halves were similarly treated with product B.

The halves of pillowcases were then compared, for odour, by an panel of 20 assessors and no significant differences were found. However, after storage for 1 week, in separate containers, the half treated with Product A was preferred to the control half in 35 of the 40 comparisons. This result demonstrates the antioxidant deposited in a formulation according to the invention is more evenly deposited over the fabric than the antioxidant in Product B and therefore supresses malodours more effectively.

EXAMPLE VII

Emulsions C and D were prepared of tallow alcohol 3EO (TA3EO), a perfume mixture, distearyl dimethyl ammonium chloride (DDAC) in water to the following compositions:

|  | TA3EO | Perfume | DDAC | Water |
|---|---|---|---|---|
| C) | 9g | 1g | 2g | 100 ml |
| D) | 6g | 4g | 1g | 100 ml |

The method of preparation was to blend the TA3EO, perfume and DDAC by melting them together, allowing the mixture to solidify, then incorporating cold water gradually to give a coarse dispersion. This was then treated ultrasonically to form a smooth emulsion.

Resin finished polyester/cotton fabric was rinsed in dilutions of these emulsions in a paddle action washing machine (Hotpoint Supermatic) using a ratio of 17 liters of liquor to 700g of fabric and adding 10 ml of one of the emulsions. The fabric was agitated in the liquor at room temperature for 15 minutes, then removed and dried.

A panel of 20 assessors was asked to smell the cloths and all could detect the difference in perfume level between the cloths treated with the two emulsions. Those treated with D were stronger than those treated with C; as would be expected from the difference in perfume content of the two emulsions. Both treated fabrics were much more strongly perfumed than one which had been rinsed in a suspension of the perfume alone at the same total concentration with reference to perfume as from emulsion D.

EXAMPLE VIII

A dispersion was prepared, by the method described in Example VII, comprising stearyl stearate (6g), a perfume mixture (4g), distearyl dimethyl ammonium chloride (1g) and water 100g.

25 ml of this dispersion was then added to 475 ml of a 4.5% dispersion of distearyl dimethyl ammonium chloride in water. To a further sample of the 4.5% dispersion was added the same perfume mixture, alone, to a level of 0.2%. These two dispersions were then used for final rinse treatment of wash loads.

Balanced laundry loads containing cotton terry towelling hand towels were washed in an AEG Lavamat Regina drum type washing machine with an unperfumed detergent product using the 60° C. wash programme. Each load was treated, in the final rinse, with one of the above two dispersions. After four loads had been treated with each dispersion the hand towels were assessed by an expert panel for softness. No significant differences were found between the two dispersions. However, the panel were unanimous that those towels treated with the dispersion containing the carrier were much more highly perfumed than those treated with the dispersion containing the perfume mixture alone.

EXAMPLE IX

A dispersion was prepared, by the method described in Example VII, comprising N,N-ditallow ethanolamine (5g), distearyl dimethyl ammonium chloride (0.5g) the optical brightening agent, 1-p-carboxymethyl phenyl-3-p-chlorophenyl-$\Delta^2$-pyrazoline (0.05g) and water (100 ml).

A dilution of this dispersion containing 50 mls in 45 liters was used to rinse 3 kg of non-fluorescent cotton terry towels for 10 minutes at room temperature. A similar load of towels was rinsed in a solution containing 50 mls of a 0.5% dispersion of distearyl dimethyl ammonium chloride. Attempts to obtain a 5% dispersion of N,N-ditallow ethanolamine as an additional control were unsuccessful.

This formulation is an embodiment wherein the organic matrix material provides a desirable benefit, i.e. fabric softening. The fluorescer is nylon substantive but has been made cotton substantive by use of the invention.

EXAMPLE X 16 pieces of cotton terry towelling (20 cms×20 cms) were pushed together at 60° C. for 15 mins in 3 liters of a 0.4% solution of a conventional laundry detergent. The pieces were rinsed twice in cold water and separated into four sets of four pieces for the third rinse. The sets of four pieces were then rinsed for 5 mins in 800 ml cold water containing:

A—nothing—this was the control set.
B—2 ml of a dispersion, prepared as in Example VII, comprising 5% paraffin wax and 0.05% distearyl dimethyl ammonium chloride.
C—2 ml of a 0.5% dispersion of distearyl dimethyl ammonium chloride.
D—10 ml of a 1% dispersion of paraffin wax in water (a 5% dispersion was not sufficiently stable to be usable).

After drying, the fabrics were rearranged into sets of four fabrics where a set comprised one fabric from each of the treatments. These sets were then assessed for softness by an panel of 5 experienced assessors. The form of assessment was to rank the cloths in each set with 1 point being awarded to the softest cloth and 4 points to the harshest. Thus, if one treatment consistently gave the softest cloth in each set the total score for that treatment would be 20. Similarly, if one treatment consistently gave the harshest cloth its total score would be 80.

The actual scores for the above treatments were
A 68
B 26
C 55
D 51

Thus the control rinse A was not significantly different from treatments C and D. Treatment B gave a significantly softer set of cloths. This result was found because there was not enough softener alone to make a significant difference, but the softener and paraffin wax gave a significant difference when deposited together.

What we claim is:

1. An improved liquid composition for use in treating fabrics to impart a sensorially perceivable effect thereto by the deposition of a sensorially perceivable effect producing material thereon and of the type comprising a sensorially perceivable effect producing material in water, the improvement comprising: said effect producing material being present in said composition as a component of a first dispersed phase dispersed in an aqueous phase, wherein:
   (a) said first phase is present in said composition at a level of about 0.5 to about 50 percent of said composition;
   (b) said first phase is a particulate phase comprising:
      (i) about 25 to about 90 percent by weight of said phase of a substantially water insoluble organic matrix material;
      (ii) about 0.5 to about 50 percent by weight of said phase of a cationic material; and
      (iii) about 0.5 to about 50 percent by weight of said phase of a sensorially perceivable effect producing material; and
   (c) said aqueous phase is present in said composition at a level of about 50 to about 99.5 percent by weight of said composition.

2. A liquid composition according to claim 1 further comprising a second dispersed phase dispersed in said aqueous phase, wherein said second dispersed phase is present in said composition at a level of about 0.5 to about 30 percent by weight of said composition and comprises a fabric conditioning material.

3. A liquid composition according to claims 2 wherein said fabric conditioning material is a fabric softening agent.

4. A liquid composition according to claim 2 wherein said second phase is present at a level of about 2 to about 15 percent by weight of said composition.

5. A liquid composition according to claim 1 wherein said cationic material is present at a level of about 2 to about 10 percent by weight of said first phase.

6. A liquid composition according to claim 1 wherein said first phase is present in said composition at a level of about 0.5 to about 10 percent by weight of said composition.

7. A liquid composition according to claim 1 wherein said first phase is present in said composition at a level of about 0.5 to about 2 percent by weight of said composition.

8. A liquid composition according to claim 1 wherein said sensorially perceivable effect producing material imparts a visually perceivable effect.

9. A liquid composition according to claim 1 wherein said sensorially perceivable effect producing material imparts a olafactually perceivable effect.

10. A liquid composition according to claim 9 wherein said sensorially perceivable effect producing material is a perfume.

11. A liquid composition according to claim 1 wherein said sensorially perceivable effect producing material imparts a tactilly perceivable effect.

12. A liquid composition according to claim 1 wherein said organic matrix material is a sensorially perceivable effect producing material.

13. A liquid composition according to claim 1 wherein said organic matrix material is a non-cationic material.

14. A liquid composition according to claim 1 wherein said organic matrix material is a nonionic material.

15. A liquid composition according to claim 1 wherein said organic matrix materials solubility in said aqueous phase does not exceed 200 parts per million.

16. A liquid composition according to claim 15 wherein said solubility does not exceed 50 parts per million.

17. A liquid composition according to claim 1 wherein said cationic material of said first dispersed phase has a solubility in water at 25° C. not greater than 5 grams per liter.

18. A liquid composition according to claim 1 wherein said cationic material of said first dispersed phase is a fabric softening agent.

19. A liquid composition according to claim 1 wherein said organic matrix material selected from the group consisting of:
  (a) aliphatic alcohols having from 8 to 22 carbon atoms;
  (b) aliphatic alcohols ethoxylated with up to about 5 moles of ethylene oxide; and
  (c) esters of the general formula:

$$RCOOR_1$$

wherein R and $R_1$ are each alkyl or alkenyl groups having about 8 to about 22 carbon atoms.

20. A method of preparing the liquid composition according to claim 1 comprising:
  (a) melting the components of said first phase together; and
  (b) dispersing said first phase into said aqueous phase of a component thereof while said first phase is still in the moltant state.

21. A method of preparing the liquid composition according to claim 1 comprising:
  (a) melting the components of the first phase together;
  (b) cooling said molten first phase until it solidifies; and
  (c) dispersing said solidified first phase in said aqueous phase or a component thereof.

* * * * *